May 16, 1933. W. J. CHIEVITZ 1,908,956
AXLE BEARING AND OIL CLOSURE
Filed March 15, 1929
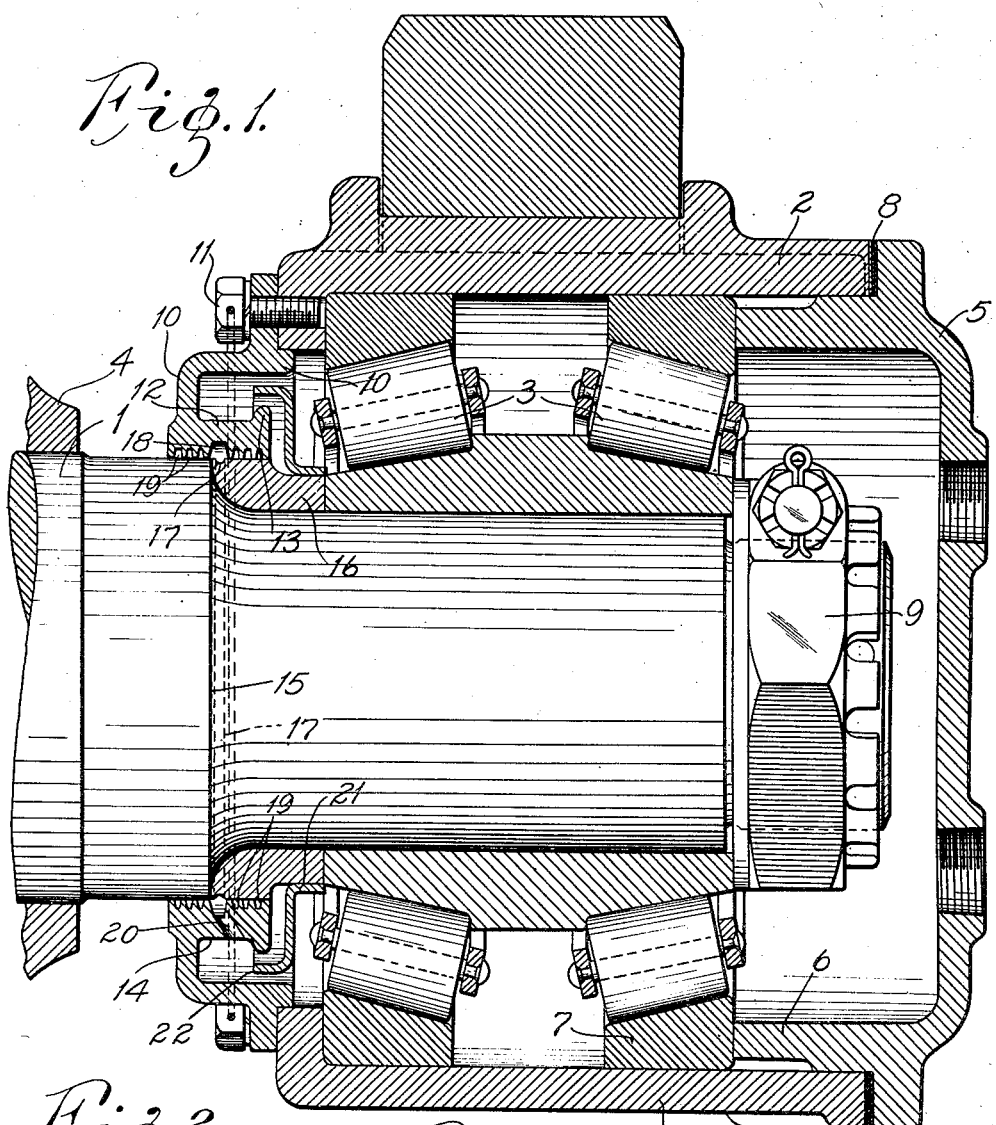
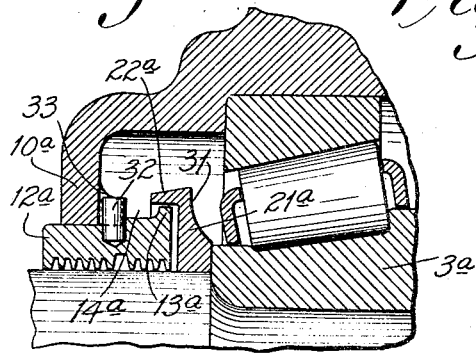
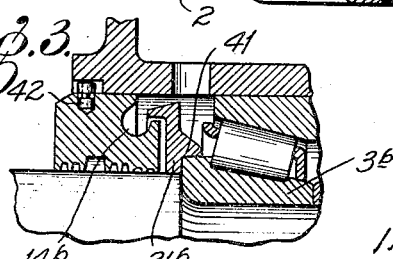
INVENTOR
William J. Chievitz,
by Cauthan & Gravely,
HIS ATTORNEYS Patented May 16, 1933

1,908,956

UNITED STATES PATENT OFFICE

WILLIAM J. CHIEVITZ, OF CANTON, OHIO, ASSIGNOR TO THE TIMKEN ROLLER BEARING COMPANY, OF CANTON, OHIO, A CORPORATION OF OHIO

AXLE BEARING AND OIL CLOSURE

Application filed March 15, 1929. Serial No. 347,403.

My invention relates to the retaining of lubricant in the housings of bearings, particularly railway car axle bearings; and it has for its principal object a construction that effectively retains liquid lubricant in the bearing housing and that is simple and economical to manufacture. The invention consists principally in the axle bearing construction and housing and lubricant retainer therefor and in the parts and combinations and arrangements of parts hereinafter described and claimed. In the accompanying drawing, Fig. 1 is a longitudinal sectional view of a railway car axle bearing construction embodying my invention; and Figs. 2 and 3 are fragmentary sectional views showing slightly modified forms of bearing closures and mounting arrangements.

The end of a railway car axle 1 projects into a bearing housing or journal box 2 and roller bearings 3 are interposed between the axle and said journal box. The car wheel of which only a fragment 4 is shown is secured to the axle adjacent to said journal box 2. The outer end of the journal box 2 is closed by a cover plate 5 that may have a tubular sleeve portion 6 extending into the journal box and serving as a means for positioning the outer bearing member 7 of a roller bearing, shims 8 interposed between the cover plate and the end of the journal box permitting adjusting of the bearing. A lock nut 9 on the end of the axle holds the bearings thereon.

At the inner end of the journal box 2 is a closure ring member 10 that may be separate from the journal box and secured thereto by screws 11. Said closure ring has an inwardly extending sleeve portion 12 that has a raised edge portion 13, whereby the sleeve is provided with a groove or channel 14 around its periphery.

Mounted on the axle 1 between the inner end of the bearings 3 and a shoulder 15 on the axle is a collar 16 that is reduced in diameter at one end and that has its main body portion of the same diameter as the portion of the axle 1 adjacent thereto. Said collar 16 is provided with an annular groove 17 in alinement with an enlarged annular channel 18 in said sleeve. On either side of said annular channel, said sleeve has in its bore annular grooves 19 encircling the axle 1 and said collar 16. Said grooves 19 tend to keep foreign matter out of the housing and to keep lubricant in the housing. At the bottom, said sleeve 12 is provided with a passageway 20 opening into said enlarged annular channel 18, so that any lubricant that may work its way out of the enclosure will pass downwardly through said groove or said enlarged channel and will drop down through the passageway 20 whence it is free to run back into the body of the journal box 2.

Mounted on the reduced body portion of the collar 16 is a ring 21 that has a flange 22 at its outer periphery extending over the edge 13 of said sleeve 12. Said ring 21 rotates with the axle and lubricant is, by centrifugal action, flung back by said ring 21 into the body of the box and onto the bearings. Any lubricant that might work its way past the ring 21 or lubricant flinger will enter the peripheral groove or channel 14 of the sleeve 12, which groove will act as a drain or gutter through which the lubricant will pass to the bottom of the sleeve, where it is free to re-enter the body of the housing.

In the slightly modified construction shown in Fig. 2, the collar 16 is dispensed with and the lubricant flinger ring 21a is mounted directly on the axle, abutting against the end of an inner bearing member 3a of the bearing. In this construction the outer surface of the flanged portion 22a of the ring that overhangs the sleeve 12a tapers from the body of the housing toward said sleeve. Lubricant is likewise returned directly to the bearings by reason of the peripheral portion 31 of the face of the ring adjacent to said bearings being dished or recessed. In Fig. 2, the sleeve 12a is a separate member that is secured to an end flange 10a or closure ring portion that is integral with the journal box, the sleeve 12a being secured to the flange 10a by means of a pin 32 fitting between lugs 33 on said flange. The drain channel 14a is formed between the raised marginal portions 13a of the sleeve 12a and said flange 10a.

Fig. 3 shows another slightly modified form of the invention in which the lubricant ring 21b has a rabbeted inner edge portion 41 providing a seat for the end portion of an inner bearing member 3b of the roller bearings. In this construction, the sleeve is inserted in the bore of the journal box and secured therein by means of a pin 42. The drain channel 14b is of circular shape and somewhat narrower than the channels shown in the other forms.

The above described construction has the very important advantage of permitting the use of liquid lubricants instead of the thick greases that are required in ordinary constructions. Applicant's closure device forms a seal that is very effective in preventing leakage of liquid lubricant; and any slight amount of lubricant that may work its way out of the enclosure is promptly returned thereto. The device is simple in construction and economical to manufacture.

What I claim is:

A car axle construction comprising an axle, a journal box into which the end of said axle extends, bearings interposed between said axle and said journal box, a separate closure ring at the inner end of said journal box having a sleeve portion extending from the inside face thereof and closely encircling said axle, said sleeve portion being provided with a peripheral channel and also being provided with an enlarged annular channel in its bore and with annular grooves on either side thereof and also having a transverse passageway at the bottom opening into said internal annular channel and adapted to return lubricant to said journal box and a ring disposed between said bearings and said sleeve portion, said ring having a projecting annular flange overhanging the edge of said sleeve portion.

Signed at Canton, Ohio, this 11th day of March, 1929.

WILLIAM J. CHIEVITZ.